Feb. 16, 1937. W. BISHOP 2,070,645
FINISH AND FILLER STRIP
Filed Nov. 5, 1934
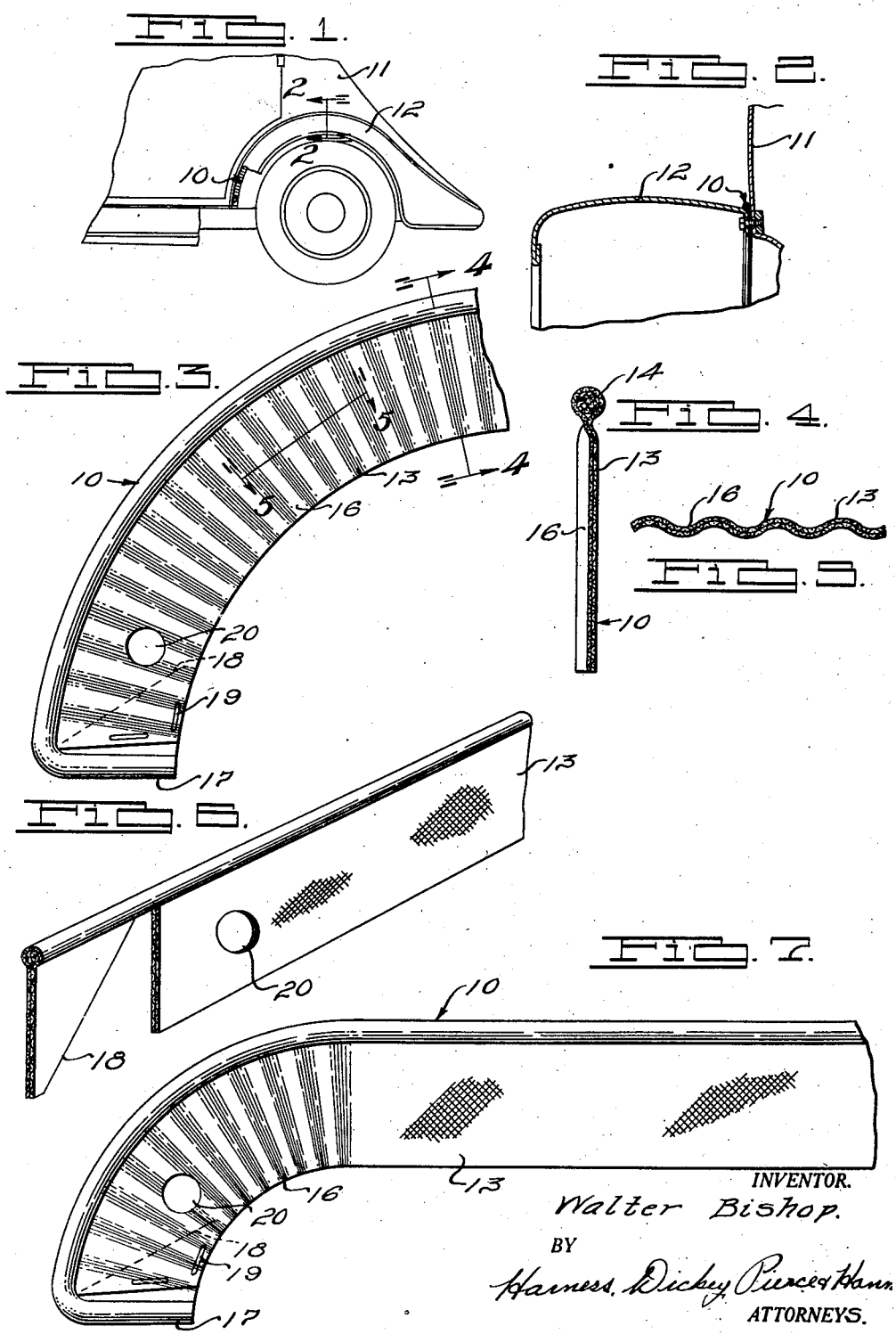
INVENTOR.
Walter Bishop.
BY
ATTORNEYS.

Patented Feb. 16, 1937

2,070,645

UNITED STATES PATENT OFFICE 2,070,645

FINISH AND FILLER STRIP

Walter Bishop, Detroit, Mich., assignor to Backstay Welt Co., a corporation of Indiana Application November 5, 1934, Serial No. 751,518

6 Claims. (Cl. 154—2)

The invention relates to finish and filler strips adapted particularly to be used on automobiles between closely adjacent parts.

One object of the invention is to provide improved form of welt having a bead along one edge thereof, which can be manufactured inexpensively and applied very readily between adjacent parts of the automobile.

Another object of the invention is to provide an improved form of welt having a bead along one edge and which has a curve producing means so as to facilitate application of the welt between curved parts of the automobile.

Another object of the invention is to provide a method of constructing a welt having a bead along one edge, wherein the welt may be provided with desired curvatures or bends in accordance with the curved portions of an automobile or the like where it is to be used.

Other objects of the invention will become apparent from the following specification, the drawing relating thereto and from the claims hereinafter set forth.

For a better understanding of the invention reference may be had to the drawing wherein:

Fig. 1 is a fragmentary and elevational view of an automobile illustrating how a welt is employed between the fender and body.

Fig. 2 is a cross sectional view on a larger scale taken substantially along the line 2—2 of Fig. 1.

Fig. 3 is a fragmentary view illustrating the welt utilized in Fig. 1.

Fig. 4 is a cross sectional view on a larger scale taken substantially along the line 4—4 of Fig. 3.

Fig. 5 is a cross sectional view on a larger scale taken substantially along the line 5—5 of Fig. 3.

Fig. 6 is a fragmentary view of the welt prior to bending and overlapping an end thereof and prior to forming a bend in the welt.

Fig. 7 is a view similar to Fig. 3 illustrating how the welt may be provided with curved and straight portions.

In the construction illustrated by Figs. 1 and 2, the welt is indicated at 10 and is disposed between the body 11 and the fender 12 of the automobile. This welt as particularly shown by Fig. 4, comprises a strip of fabric 13 folded along its center about a bead filler 14 so as to provide a leg having a bead at one edge. In the construction shown, the fabric 13 is exteriorly coated with a lacquer or the like so as to provide a water-proof surface as well as smooth finish and the overlapping layers of fabric are cemented together.

Welts of this character are adapted for use in automobiles particularly and in some instances it is not necessary to bend the welt, whereas in others it is necessary to bend it, as for example when it is applied between the body 11 and fender 12. In some cases also, a part of the welt must be bent with one curvature, another with a different curvature, etc., and in some cases parts of the welt must be curved and others must be straight.

Where it is not necessary to bend the welt, no difficulty is encountered in applying it, but considerable difficulty is encountered where bends must be made by the workman applying the welt and this difficulty is greater when bends of different curves are necessary in the same strip and when perhaps an intermediate part must be applied in a straight condition. It should readily be appreciated that it is difficult for the workman to make these bends for the reason that the welt must be bent in its own plane and while little effort is required to bend it, the strip naturally tends to return to its straight condition and the workman must hold the curved portion to prevent its return to the straight condition. Moreover, in bending the strip from its straight condition when it is applied, the leg portion of the welt buckles to one side or the other in long and large loops or folds and this renders it difficult to insert the leg between the surfaces between which it is to be applied.

According to the present invention, the welt before it is to be applied, is provided with corrugations 16 in its leg portion which extend from adjacent the bead to the other edge of the strip. Forming these corrugations naturally shortens the overall length of the leg and draws the be... into a curved condition and the amount of curvature attained may be varied by varying the character of the corrugations. These corrugations are formed by corrugated members pressing the leg between them and by applying varying degrees of pressure so as to vary the depth of the corrugations in the leg, or using different sizes or spacing of corrugations, the curving of the bead may be varied. The material in the leg of the welt is such that its corrugated condition will substantially remain so that the welt and bead may be provided with a substantially permanent curvature in accordance with the curvature desired. While the operative thickness of the leg is increased by the corrugations, the increase is not such as to cause any difficulty in inserting the leg between surfaces where it is to be used, and manifestly the corrugations do not introduce the difficulty encountered wherein a straight welt is bent in applying it, in which case the leg buckles in long and large folds to one side or the other. Even the operative thickness of the corrugated leg may be reduced by using a greater number of smaller corrugations in a given length.

Accordingly when a curved welt is desired for a particular application, the curvature may first be provided by corrugating the leg, so that the finished welt has substantially the curvature of the parts between which it is to be applied. If a welt is necessary, wherein a curved part and a straight part are required, such as shown by Fig. 7, corrugations may be formed only along the part to be curved, so as to attain a construction such as shown by this figure.

Preferably in constructing a welt of this character, the end of the bead is bent over, as indicated at 17 so as to avoid an exposed cross section of the bead, and in bending over this portion, the leg of the welt may be notched as indicated at 18 in Fig. 6 and then the end bent over and stitched as indicated at 19. Bolt receiving openings 20 may be provided for receiving bolts ordinarily employed in connecting the fender to the body or in connecting other parts between which the welt may be employed.

It may be added that in the welt described and illustrated the material employed may be sufficiently form retaining, although flexible, that the corrugations will remain in the leg even though the welt is straightened or tensioned and accordingly the corrugations will revert the welt to its bent condition. In other words after the corrugations are once formed, they tend to remain in the material, although permitting straightening of the welt, if straightening in any way is required in applying it.

Although only one form of the invention has been illustrated and described in detail, it will be apparent to those skilled in the art that various modifications may be made without departing from the scope of the appended claims.

I claim:

1. A curved welt comprising a strip of flexible material having a bead at one edge curved toward the opposite edge, said strip between the bead and opposite edge having preformed corrugations extending transversely to the bead and which hold the bead and the welt in its curved condition.

2. A curved welt comprising a strip of fabric having a bead at one edge curved towards the opposite edge, said strip between the bead and the opposite edge having preformed corrugations extending transversely to the bead and which hold the bead and welt in its curved condition.

3. A curved welt comprising a strip of fabric folded about a bead filler to provide a bead at one edge curved towards the opposite edge of the welt and a leg projecting from the bead and which comprises a double layer of the fabric, and means securing the two layers of fabric together, said leg having preformed corrugations extending transversely to the bead and which hold the bead and welt in its curved condition.

4. The method of constructing and forming a curved welt, which comprises providing a strip of material with a bead at one edge, and then forming corrugations in the strip by pressure on opposite faces of the web between the bead and opposite edge and which extend transversely to the bead, so as to automatically cause the welt and the bead portion thereof to bend in the plane of the welt.

5. The method of constructing and forming a curved welt, which comprises providing a strip of material having a relatively stiff portion along one edge, and forming transversely extending corrugations by pressure on opposite faces of the web between the stiffer edge and the other edge so as to cause the stiffer edge and strip to bend in the plane of the latter.

6. The method of constructing and forming a curved welt, which comprises providing a strip of material with a bead along one edge and then providing transversely extending folds by pressure on opposite faces of the web between the bead and opposite edge of the strip to cause the bead and strip to bend in the plane of the strip.

WALTER BISHOP.